United States Patent [19]

Mackal

[11] Patent Number: 5,024,558
[45] Date of Patent: Jun. 18, 1991

[54] APPARATUS FOR MAKING INFLATOR PARTS

[76] Inventor: Glenn H. Mackal, 4923 59th Ave. S., St. Petersburg, Fla. 33715

[21] Appl. No.: 523,102

[22] Filed: May 14, 1990

[51] Int. Cl.⁵ .................... B29C 39/10; B29C 45/14
[52] U.S. Cl. ............................... 425/121; 249/83; 425/122; 425/127
[58] Field of Search ............... 425/116, 117, 121, 122, 425/127; 249/83, 85, 88

[56] References Cited

U.S. PATENT DOCUMENTS

| | | | |
|---|---|---|---|
| 2,288,899 | 7/1942 | Gits | 425/122 |
| 4,029,453 | 6/1977 | Campion | 425/122 |
| 4,044,984 | 8/1977 | Shimuzu | 249/83 |
| 4,345,889 | 8/1982 | Sizemore et al. | 425/121 |
| 4,697,784 | 10/1987 | Schmid | 425/121 |

Primary Examiner—Willard E. Hoag

[57] ABSTRACT

A mold for making articles that are interconnected by a lanyard, such as inflator parts. A mold base has a channel formed in it, and a first block is slidably mounted in that channel. A groove formed in the block defines the contour of a first article produced by the mold when plastic is injected into the groove and a mating groove formed in a mold cover that overlies the base. A stationary second block, also disposed in the channel, has a cavity formed in it that defines the contour of a second article. Opposite ends of the lanyard are positioned in the respective areas bounded by the grooves and cavity so that the opposite ends of the lanyard are embedded in the articles produced by the mold. The length of the interconnecting lanyard is adjusted by adjusting the position of the moveable block within the channel. The movable block may also be stationery.

8 Claims, 2 Drawing Sheets

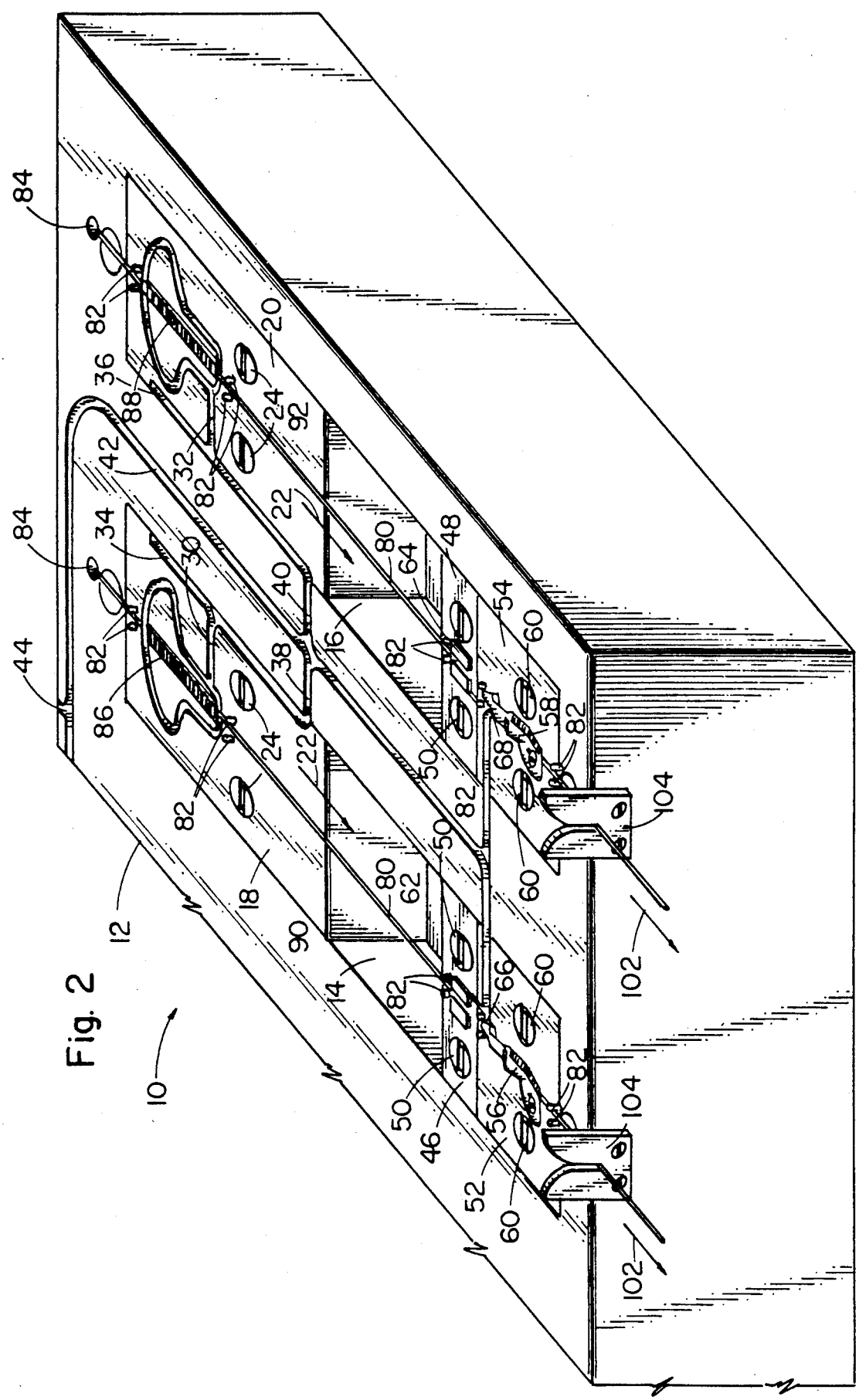

APPARATUS FOR MAKING INFLATOR PARTS

TECHNICAL FIELD

This invention relates, generally, to an adjustable mold that makes two lanyard-interconnected parts of the type used in inflators. More particularly, it relates to a method of making a handle, lanyard and bell crank assembly as a single unit.

BACKGROUND ART

Inflators are devices used for the rapid inflation of inflatable articles such as life vests, rafts and the like.

A common inflator screw threadedly receives a gas cartridge therein; the cartridge is pierced by a pin, slidably disposed within the inflator, that is driven into piercing engagement with the cartridge when a lanyard is pulled. More specifically, a first or trailing end of the lanyard is attached to a handle and a second or leading end of the lanyard is attached to a bell crank that is pivotally mounted to the inflator. In prior art inflators, the lanyard is tied or crimped to the bell crank. Typically, the bell crank has an aperture through which the leading end of the lanyard is passed and a knot or other suitable means, such as a crimping means, is employed to prevent separation of the lanyard from the bell crank. Thus, the lanyard and bell crank are separate components that require attachment to one another; since the bell crank is metallic and the lanyard is a cord means, the lanyard becomes frayed and worn from its abrasive contact with the bell crank. Similarly, the trailing end of the lanyard is attached to the handle by a similar tying or crimping technique.

Pulling the lanyard by pulling the handle thus rotates the bell crank about its pivot shaft and an arm of the bell crank cammingly engages and drives the pin into the gas cartridge. The escaping gases are routed to an inflation manifold confluent with the inflatable article and the article is rapidly inflated.

The length of the lanyard can vary several inches depending upon the application. Thus, most inflator manufacturers produce inflators having differing lanyard lengths. However, the art has never developed a method for the mass production of handles and bell cranks connected to one another by lanyards of differing lengths. Even more importantly, the art has never developed an apparatus or method for producing handle, lanyard and bell crank assemblies that are integrally formed as a monolithic unit. The prior art, when considered as a whole, neither teaches nor suggests how the limitations of the art could be overcome.

DISCLOSURE OF INVENTION

The novel method for interconnecting inflator handles and inflator bell cranks with lanyards of differing lengths includes the steps of forming handle-defining grooves in a moveable block member that is slidably disposed in an elongate channel formed in a mold base, forming a bell crank-defining cavity in a stationary block disposed in said channel at an opposite end thereof, and extending a lanyard therebetween such that its opposite ends are within the longitudinally spaced areas surrounded by the grooves or occupied by the cavity so that said opposite ends are embedded in their respective articles when said grooves and cavities are filled with plastic. To shorten the length of the interconnecting lanyard, the moveable block is moved toward the stationary block.

A longitudinally extending runner or branch is formed on an edge of the moveable block and that runner is slidably mounted with respect to a laterally extending branch that is in open fluid communication with a pressurized source of plastic in flowable form. Accordingly, the longitudinally extending branch remains in open fluid communication with the laterally extending branch throughout the entire range of motion of the moveable block.

The lanyard is fed into the mold from a reel positioned therebelow. Accordingly, as each handle/bell crank set is finished, the completed assembly is removed from the mold by pulling on the free or leading end of the lanyard until the handle clears the leading end of the mold; that action positions a new length of lanyard so that its opposite ends are in registration with the groove and cavities from which the next articles are to be formed.

The novel mold thus produces an integral unit having three components, i.e., the handle, lanyard and bell crank. Significantly, the mold is therefore novel, even if its adjustability is deleted.

Thus it should be understood that an important object of this invention is to provide a method for the fast production of integrally formed inflator handles, lanyards and bell cranks.

Another important object is to provide such integrally formed assemblies having lanyards of differing lengths.

Another object is to provide a novel mold capable of carrying out the novel method of this invention.

Still another object is to provide a means whereby removing a completed article from a mold simultaneously prepares the mold to make another article.

These and other objects and advantages of the invention will become apparent as this description proceeds.

The invention accordingly comprises the features of construction, combination of elements and arrangement of parts that will be exemplified in the construction set forth hereinafter and the scope of the invention will be set forth in the claims.

BRIEF DESCRIPTION OF THE DRAWINGS

For a fuller understanding of the nature and objects of the invention, reference should be made to the following detailed description, taken in connection with the accompanying drawings, in which:

FIG. 2 is a perspective view thereof.

BEST MODES FOR CARRYING OUT THE INVENTION

Figure 1:
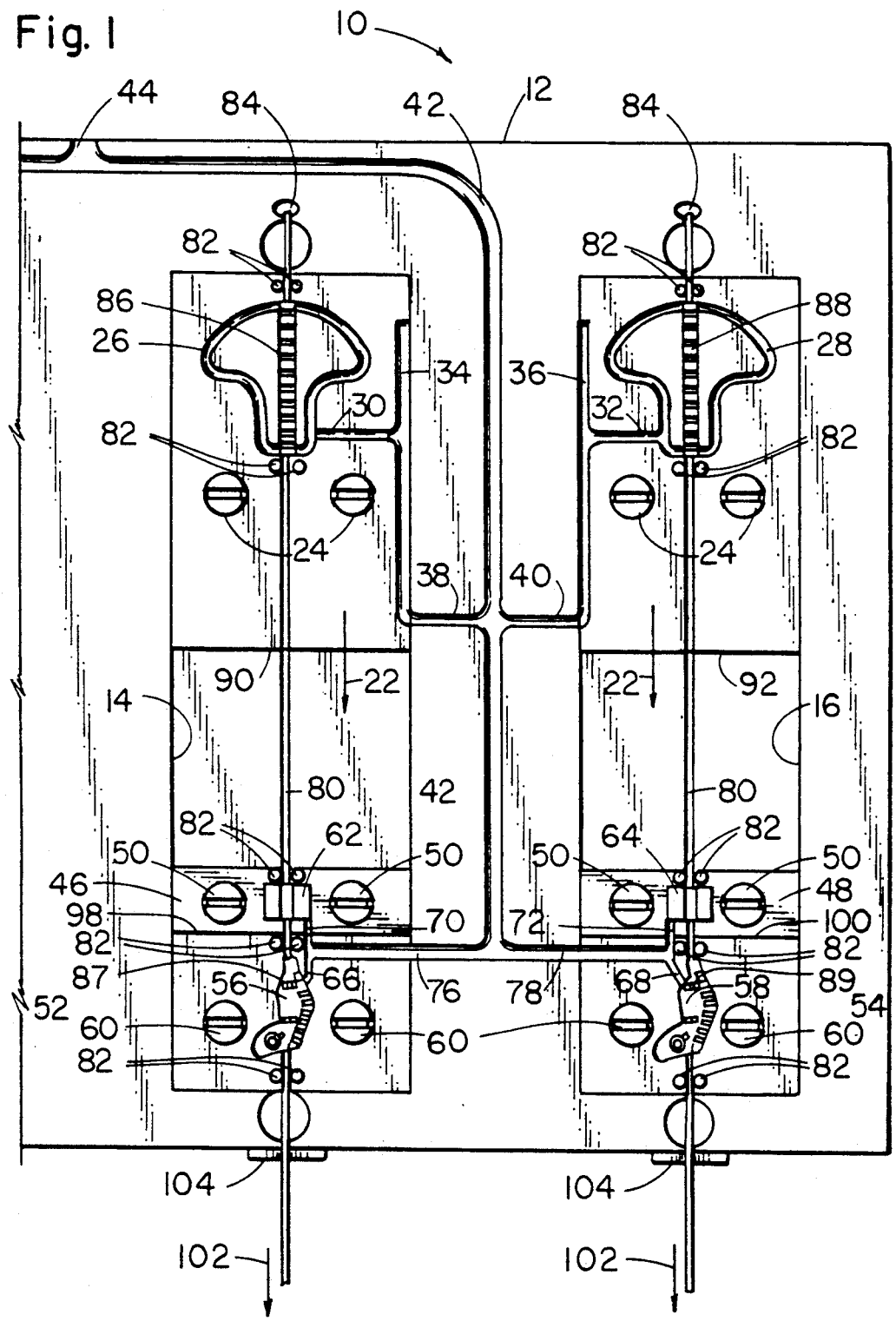
FIG. 1 is a top plan view of an exemplary embodiment of the invention.

An illustrative embodiment of the present invention is denoted as a whole by the reference numeral 10 in FIGS. 1 and 2. It should be understood from the outset that structure 10 has an unillustrated counterpart of mirror image construction, and that both parts are placed into cooperative registration with one another before plastic in liquid form is injected therebetween. The end of the apparatus at the bottom of FIG. 1 is hereby declared to be the leading end thereof, and the end at the top of FIG. 1 is, accordingly, its trailing end.

Mold blank 10 and its unillustrated counterpart or cover include a generally parallelepiped base member 12; in this particular embodiment, base 12 includes two main cavities or channels 14, 16 for producing the final product, and said elongate channels are disposed in lateral relation to one another, i.e., base 12 exhibits bilateral symmetry. Clearly, only one such channel 14 or 16 could be provided for each base 12, or a larger base with more than two elongate channels could be provided. The number of channels is not critical to this invention.

Each channel 14, 16 has a moveable block 18, 20 slidably disposed therewithin. It is important to note, however, that the important object of providing an integrally formed assembly is achieved even if blocks 18, 20 are not movably mounted. In the position depicted in both FIGS. 1 and 2, each block 18, 20 is fully retracted, i.e., it is positioned at the trailing end of its associated channel 14, 16. Displacement of blocks 18, 20 in the direction of directional arrow 22, i.e., toward the leading end of its channel, thus shortens, in effect, the respective operative longitudinal extents of channels 14, 16. It should be observed that blocks 18, 20 are mounted independently of each other, i.e., the effective longitudinal extent of channel 14 can be shortened by advancing block 18 and block 20 need not be advanced at all or it can be advanced a different distance. Screws, collectively denoted 24, are turned to lock blocks 18, 20 into each preselected position thereof. In another design, not shown, screws 24 are positioned on an opposite or bottom side of block 10 and are not visible in a top plan view such as FIG. 1.

Each block 18, 20 and its unillustrated counterpart includes a handle-shaped groove 26, 28 formed therein so that a plastic handle is formed when the mold base and cover are brought into operative juxtaposition to one another and liquid plastic is injected thereinto and allowed to harden. Thus, the grooves are article-defining grooves.

Handle-forming grooves 26, 28 are confluent with runners 30, 32, respectively, which are in turn in open fluid communication with longitudinally extending branches 34, 36, respectively, which are formed in the edges of their associated blocks 18, 20, as shown.

Branches 34, 36 are in sliding engagement with laterally extending branches 38, 40, respectively, which are in turn confluent with main branch 42. Plastic enters main branch 42 through injection port 44. The sliding engagement between longitudinally extending branches 34 and 36 and their associated laterally extending branches 38, 40, is an important feature of this invention; it maintains branches 34, 36 in open fluid communication with their feed branches 38, 40 in all positions of longitudinal adjustment of blocks 18, 20, respectively. For example, in both Figures, the leading end of branches 34, 36 are in respective open fluid communication with branches 38, 40 and it is clear that plastic entering branches 38, 40 from main branch 42 is directed ultimately into handle forming grooves 26, 28. If block 18 or 20 is advanced forwardly, i.e., in the direction of arrows 22, the trailing end of branch 34 or 36 will continue to be disposed in open fluid communication with its associated branch 38 or 40. This second position is the extended position of the moving block, and when said blocks 18, 20 are positioned at the trailing end of the mold body 12, they are said to be in their retracted position.

The forward travel of blocks 18, 20 is limited by blocks 46, 48, which are also disposed in the elongate channel. Blocks 46, 48 are not moveable once positioned in their respective channels 14, 16 and they are maintained in their fixed position by screws, collectively denoted 50. Screws 50 could also extend from the opposite side of the mold in the same manner as screws 24. It should be understood that blocks 46, 48 may be completely removed from channels 14, 16 when the part made by said blocks 46, 48 is not to be produced. Thus, when blocks 46, 48 are removed, the forward travel of slidably mounted blocks 18, 20 is limited by blocks 52, 54.

A generally "L"-shaped bell crank is made when plastic is injected into the cavity 56, 58 formed in blocks 52, 54, respectively; the finished bell crank is pivotally secured to an inflator, not shown, of the type that screw threadedly engages a gas cartridge, said inflators being well known to those skilled in this art. Blocks 52, 54 are not moveable, and are maintained in their respective fixed location within elongate channels 18, 20 by screw members collectively denoted 60; said screws could also extend from the opposite side of the mold.

The part made by optional blocks 46, 48 is a protective clip described in a copending disclosure, Ser. No. 07/522,621 by the same inventor, entitled "Protective Cover and Pulled Lanyard Indicator For An Inflator." The cavities for making the part are denoted 62, 64, respectively.

Cavities 56, 58 (the bell crank) and 62, 64 (the clip) are in open fluid communication with branches 66, 68 and 70, 72, respectively, and said branches are confluent with branches 76, 78 that extend laterally from the leading end of main branch 42.

As mentioned earlier, the primary purpose of mold 10 is to produce integrally formed handle and bell crank constructions and a secondary purpose is to produce such constructions having differing lengths of lanyard connected therebetween. Lanyard 80 is fed between upstanding, longitudinally spaced alignment pins, collectively denoted 82; each lanyard 80 is coiled about a reel, not shown, disposed below mold 10 at its trailing end. Thus, mold body 12 is apertured or bored as at 84, 84 so that each lanyard 80 extends from its reel through its associated bore 84 to the top or operative side of the mold body 12. Each lanyard overlies part 86, 88 of each handle mold 26, 28 and is constrained to follow a serpentine path of travel therethrough as set forth in another copending disclosure Ser. No. 07/523,105 by the present inventor, entitled "Apparatus and Method for Attaching a Lanyard to a Handle." The serpentine path of travel enhances the anchoring or embedding of the lanyard in its associated handle. Similarly, the leading end of the lanyard overlies parts 87, 89 of bell crank cavities 56, 58, respectively, and is also constrained to follow a serpentine path of travel as set forth in a copending disclosure, Ser. No. 07/523,145 by the present inventor, entitled "Apparatus and Method for Securing a Lanyard to an Inflator Lever Arm."

If it is desired to maximize the extent of lanyard 80 between handle 26, 28 and bell crank 56, 58 respectively, mold 10 is configured as depicted in both Figs., i.e., moveable blocks 18, 20 are positioned in their fully retracted position, i.e., at a maximum distance from blocks 46, 48, (or 52, 54, if blocks 46, 48 are not employed), i.e., at the trailing end of channels 14, 16. If it is desired to provide a very short lanyard, the leading ends 90, 92 of blocks 18, 20, are placed into abutting relation to the trailing ends 94, 96 of optional blocks 46, 48 or the trailing ends 98, 100 of blocks 52, 54. Clearly, there are an infinite number of intermediate positions of functional adjustment between those two extremes. To change the length of a lanyard between handle and bell crank, screws 24 are loosened, blocks 18, 20 are slid to the desired position, screws 24 are re-tightened, lanyard 80 is pulled tight as indicated by directional arrows 102 at the bottom of FIG. 1, the unillustrated counterpart of the mold 10 is lowered into operative juxtaposition with mold base 12, and plastic is injected into port 44.

It will be noted that, during the molding process, each lanyard is held in wedged relation between the closely spaced jaws of a clamp member 104, 104, best shown in FIG. 2, positioned at the trailing end of mold body 12. After the molding of parts has been completed, the two mold halves are separated from one another, i.e., the unillustrated cover is lifted from base 12. To remove the finished product and to simultaneously prepare the apparatus 10 to repeat the molding process, each lanyard is grasped at its leading end, i.e., near the bottom of FIG. 1, and lifted from its wedged engagement with its associated clamp 104. The lanyard is then held taut and lifted higher still, until bell cranks 56, 58, clips 62, 64 (if employed) and handles 26, 28 (having the trailing end of a lanyard embedded therein), are removed from their respective grooves or cavities. As those skilled in the molding arts will appreciate, the removal is accomplished primarily by a conventional knock out system. Each lanyard is then pulled again in the direction of arrows 102, thereby causing more lanyard to be unreeled and to travel in the direction of arrows 102. When a new length of lanyard has been exposed, i.e., when handles 26, 28 are positioned past their associated clamp members 104 (below said clamps 104 as depicted in FIG. 1, the lanyard is cut at the trailing end of the handle and the process is repeated. Thus, each completed handle and bell crank assembly is quickly removed from the mold and the preparation to repeat the molding process is substantially simultaneously accomplished.

This invention is clearly new and useful, and was not obvious to those of ordinary skill in the art at the time it was made, in view of the prior art, considered as a whole. This invention also pioneers the art of molds capable of producing integrally formed inflator handles and bell cranks secured to opposite ends of lanyards. It also pioneers the art of providing such assemblies in varying lengths. Accordingly, the claims that follow are entitled to broad interpretation to protect the heart or essence of the invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention which, as a matter of language, might be said to fall therebetween.

Now that the invention has been described,
What is claimed is:

1. A mold, comprising:
    a base member of predetermined configuration and dimension;
    a mating cover for said base member;
    a channel formed in said base member;
    a first slidable block member disposed within said channel and slidable lengthwise thereof;
    a second block member disposed in said channel;
    an article-defining groove formed in said block member;
    an article-defining cavity formed in said second block member;
    said blocks defining means for receiving a strand disposed between said article-defining groove and said cavity; and
    means for delivering flowable plastic to said article-defining groove in said slidably mounted first block member at any preselected position of said first block member in said elongate channel.

2. The mold of claim 1, further comprising means for locking said first block member at any preselected location within said channel.

3. The mold of claim 2, wherein said means for delivering includes a longitudinally extending runner formed in an edge of said first block member and a transversely extending runner in said base member in open fluid communication therewith, a leading end of said longitudinally extending runner being in open fluid communication with said transversely extending runner when said first block member is positioned at a trailing end of said channel and a trailing end of said longitudinally extending runner being in open fluid communication with said transversely extending runner when said first block member is positioned at a leading end of said channel.

4. The mold of claim 3, wherein the article-defining groove in said first block member is configured to define an inflator handle when plastic is injected thereinto.

5. The mold of claim 4, wherein the article-defining cavity in said second block member is configured to define an inflator bell crank when plastic is injected thereinto.

6. The mold of claim 3, further comprising a reel member rotatably mounted below said base member, a supply of lanyard being coiled about said reel member and being dispensed therefrom upon rotation of said reel member, a bore being formed in said base member adjacent its trailing end, and said lanyard extending through said bore, whereby lanyard is continuously supplied to said mold from said reel member.

7. The mold of claim 6, further comprising a third block member positioned in said elongate channel in stationary relation thereto, said third block member having an article-defining cavity formed therein, said strand extending therethrough in substantially bisecting relation therewith, whereby a third article is formed when said mold base and cover are placed in operable juxtaposition with one another and plastic is injected into said article-defining grooves and cavities.

8. The mold of claim 6 further comprising a member for clamping the strand fixedly secured at a leading end of said base member for holding taut a length of the strand during a molding process.

* * * * *